United States Patent [19]
Sidler

[11] Patent Number: 6,010,112
[45] Date of Patent: Jan. 4, 2000

[54] DRIVING DEVICE FOR A SHUT-OFF DEVICE IN A PIPE-LINE

[75] Inventor: Hans Jörg Sidler, Eschenbach, Switzerland

[73] Assignee: Sistag Absperrtechnik, Eschenbach, Switzerland

[21] Appl. No.: 09/083,178

[22] Filed: May 22, 1998

[51] Int. Cl.[7] .................................................. F16K 31/145
[52] U.S. Cl. ..................... 251/62; 251/30.05; 251/26; 251/326
[58] Field of Search ................................ 251/62, 30.05, 251/26, 326

[56] References Cited

U.S. PATENT DOCUMENTS

| | | | |
|---|---|---|---|
| 3,931,953 | 1/1976 | Allen | 251/62 |
| 4,096,881 | 6/1978 | Schabert et al. | 251/62 |
| 4,568,058 | 2/1986 | Shelton | 251/62 |
| 4,613,111 | 9/1986 | Paquet et al. | 251/62 |
| 5,150,734 | 9/1992 | Chiba | 251/62 |

*Primary Examiner*—David J. Walczak
*Attorney, Agent, or Firm*—Wenderoth, Lind & Ponack, L.L.P.

[57] ABSTRACT

A driving device for a shut-off device in a pipe-line includes a piston/cylinder unit able to be connected to a slide valve plate of the shut-off device. A working chamber of the unit is connected with the interposition of a closing valve to a pressure medium reservoir. The pressure medium reservoir has an outlet opening connected virtually directly to an opening leading into the working chamber. The closing valve is constructed so that a very short closing time of the slide valve plate connected to the piston of the unit is achieved. The opening is provided in a head of the cylinder and opens into the working chamber. The opening can be closed by a valve disc of the closing valve. An annular chamber follows the valve disc on the side remote from the opening. The pressure medium of the pressure medium reservoir arrives in the chamber. After closing, the driving device can be reused without need of exchanging a deformed part.

19 Claims, 3 Drawing Sheets

DRIVING DEVICE FOR A SHUT-OFF DEVICE IN A PIPE-LINE

BACKGROUND OF THE INVENTION

The invention relates to a driving device for a shut-off device in a pipe-line.

Driving devices of this general type are used for shut-off devices, which are used in pipe-lines of plants predominantly in the chemical and foodstuffs industries, but also in mining, in cement, textile or wood-processing plants. These shut-off devices serve in particular as a protection against explosions. At the time of propagation of a flame detected in the pipe-line or at the time of a sudden increase in pressure, the shut-off device is closed within a very short closing time, and consequently propagation of flames and thus an explosion can be prevented.

In a known shut-off device for protection against explosions according to DE-C2-30 07 689, a piston/cylinder unit actuating the shut-off device is connected by way of a line to a pressure medium reservoir, which can be opened by way of a valve. The piston and with it the slide valve plate can thus be closed in the manner of a projectile. The pressure medium reservoir is in this case manufactured from a special construction and in the operating state has a pressure of up to 40 bars. In order to absorb the impact energy produced on the slide valve plate at the time of closing of this type, coupling member inserted between the piston and the slide valve plate is constructed so that at the time of closing it strikes against a support, which consists of plastically deformable, non-elastic material and becomes permanently deformed upon impact of the coupling member. Accordingly, this support as well as the pressure reservoir must be exchanged after each impact.

SUMMARY OF THE INVENTION

In comparison therewith it was made the object of the present invention to provide a driving device for a shut-off device, by means of which a closing of the shut-off device within a closing time of a maximum of a few hundred milliseconds is facilitated, without parts which are deformed thereafter needing to be exchanged in the shut-off device or the propellant reservoir.

Furthermore, for this purpose the pressure medium reservoir should be able to be supplied with existing industrial compressed air.

Such object is achieved according to the invention due to the fact that the pressure medium reservoir with its outlet opening is connected virtually directly to an opening leading into the working chamber of the piston/cylinder unit, and a closing valve is constructed so that a very short closing time, preferably of a maximum of 500 milliseconds, of the slide valve plate connected to the piston is achieved.

With this driving device according to the invention, the slide valve plate of a shut-off device can be closed within fractions of a second, so that the necessary closing time for a successful interruption of an explosion developing in the pipe, either due to the propagation of a flame or due to a disproportionate pressure increase, is adequate. The shut-off device can then be returned to the open position, without manipulations by hand, such as for example an exchange of a deformed damping member or of the pressure medium reservoir, having to be carried out on the device.

BRIEF DESCRIPTION OF THE DRAWINGS

One embodiment of the invention, as well as further advantages thereof, will be described in detail hereafter with reference to the drawings, in which.

DETAILED DESCRIPTION OF THE INVENTION

Figure 1:
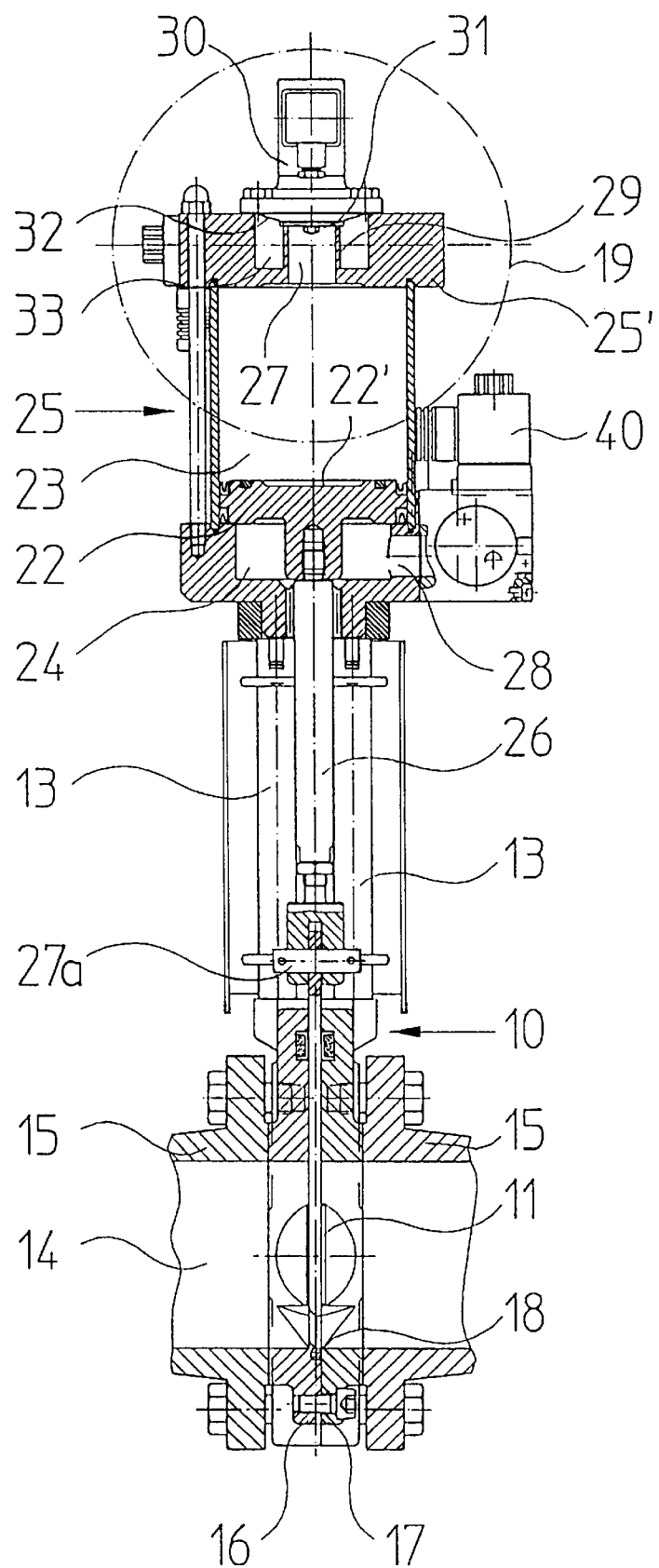
FIG. 1 is a longitudinal section of a driving device and of a shut-off device according to the invention.
Figure 2:
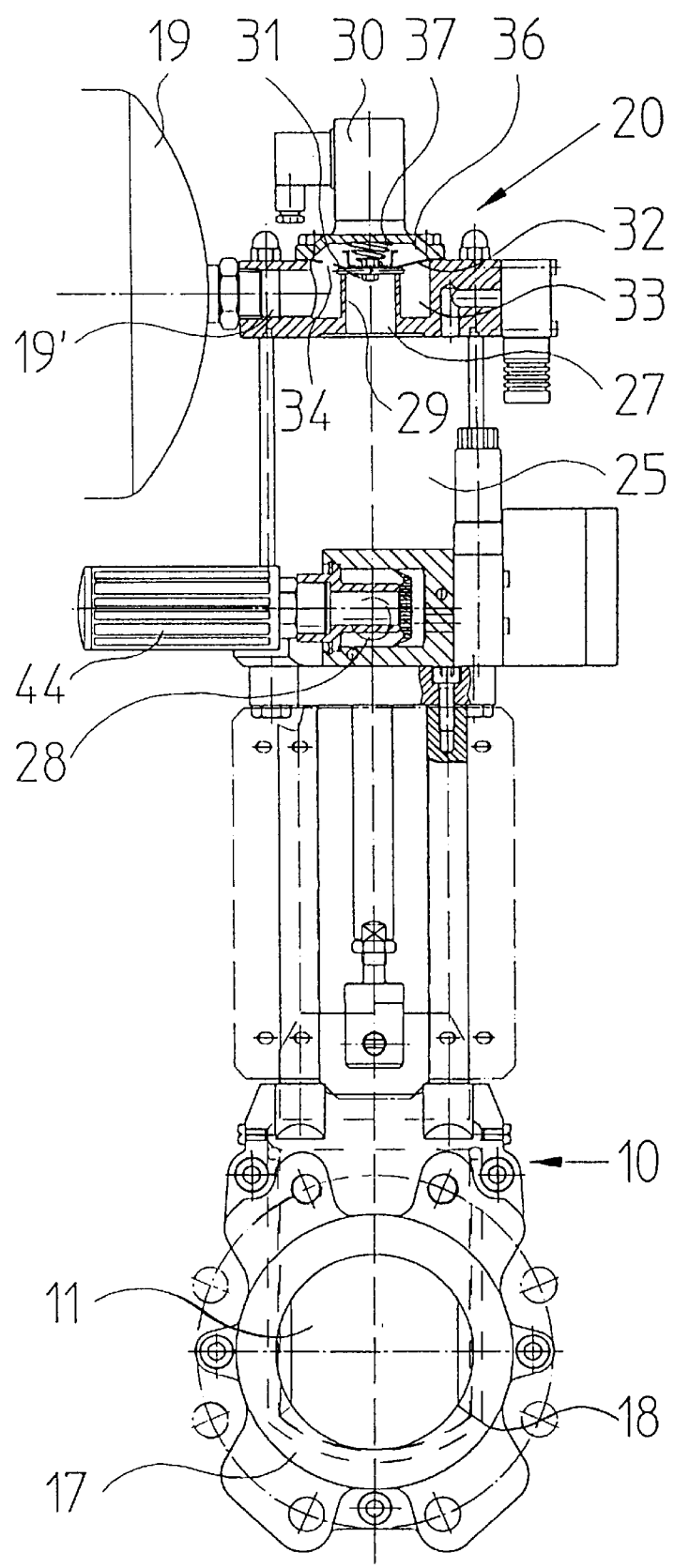
FIG. 2 is a front view of the shut-off device and of the driving device according to FIG. 1 partly in section.

FIGS. 1 and 2 show a driving device 20 for a shut-off device 10, which is inserted in a pipe-line 15. The conventional shut-off device 10 is used in particular for the purpose of protection against explosions in plants where dust explosions or the like may occur, which result for example from a spark, friction, overheated devices in the plant or other causes. With a shut-off device of this type, the propagation of a flame spreading through the pipes of the plant can be stopped and a transfer to further regions of the plant and thus an explosion are prevented.

The shut-off device 10 mounted in the pipe 15 and extending transversely thereto has a slide valve plate 11 able to slide longitudinally and shown in the closed position. The latter is guided in a two-part housing 16, 17 and at the bottom it strikes against a gasket 18 located between the two housing parts 16, 17. Thus, in the position shown, the slide valve plate 11 completely closes the pipe opening 14. In the open position, the under side of the slide valve plate 11 is located above the pipe opening 14, which is thus correspondingly cleared.

The driving device 20 in turn appropriately comprises a piston/cylinder unit 22, 25, in which the piston 22 with a piston rod 26 is arranged to slide in the cylinder. The piston rod 26 is connected by way of a coupling member 27a to the slide valve plate 11 of the shut-off device 10, while the cylinder 25 is held -by way of uprights 13 by the housing 16, 17. Provided in the cylinder 25 is an upper working chamber 23 connected to a pressure medium reservoir 19 by way of a valve 30, which chamber is defined on the under side by the upper piston surface 22'. Formed below the piston 22 is a displacement chamber 24, which leads to an air-vent valve 40 with sound insulation.

According to the invention, outlet opening 19' of the pressure medium reservoir 19 is connected virtually directly to the opening 27 leading into the working, chamber 23; and the valve 30 is in this case constructed such that, upon opening thereof, such a quantity of the pressure medium flows into this working chamber 23, that a closing time of the slide valve plate 11 connected to the piston 22, preferably of a maximum of 500 milliseconds, is achieved. This closing time depends on the specific application, in particular also on the nominal width of the pipe opening, the storage pressure and/or the storage volume.

The outlet opening 19' located almost directly at the opening 27, is provided in particular by the direct connection of the reservoir 19 to the valve 30, in which case advantageously no line or hose is provided between the reservoir 19 and the valve 30. If need be, a short intermediate member could be installed. The distance from the inside of the reservoir into the working chamber 23 is therefore kept as short as possible, i.e. at a maximum of a few centimeters. The opening 27 could therefore also be arranged not as shown, namely concentric to the axis of the cylinder, but parallel to the latter, offset towards the reservoir 19, in order to keep this distance even shorter.

In one very advantageous construction, an opening 27 provided in the cylinder head 25' opens into the working chamber 23, this opening 27 being able to be closed by a valve disc 31 of the valve 30. After this valve disc 31, an annular chamber 33 is provided, in which the pressure medium from the pressure medium reservoir 19 arrives. The opening 27 located in the cylinder head 25' is formed by a ring 29 arranged coaxially with respect to the axis of the cylinder, which ring is in turn surrounded by the annular chamber 33. In the closed state, the valve disc 31 is pressed hermetically from time to time by a spring 37 against this ring 29. In this case, this valve disc 31 is held by a diaphragm 32 surrounding it, which diaphragm is attached on the outer periphery in the cylinder head 25'. The diaphragm 32 has at least one through-hole 34, through which the pressure medium from the chamber 33 is guided into a valve chamber 36 and brings about an additional pressing force of the valve disc 31 against the ring 29. At the time of opening, the valve disc 31 is lifted, for example electromagnetically, from the ring 29 and the pressure medium flows from the annular chamber 33 below the valve disc into the opening 27 into the working chamber 23 and starting with the release of the opening, brings about the fastest possible displacement of the piston 22 into the closed position illustrated. The displacement chamber 24 has an outlet opening 28, to which the air-vent valve 40 is connected, which comprises a sound insulation member 44, due to which a pop due to the air escaping from the chamber 24 can be largely prevented.

Figure 3:
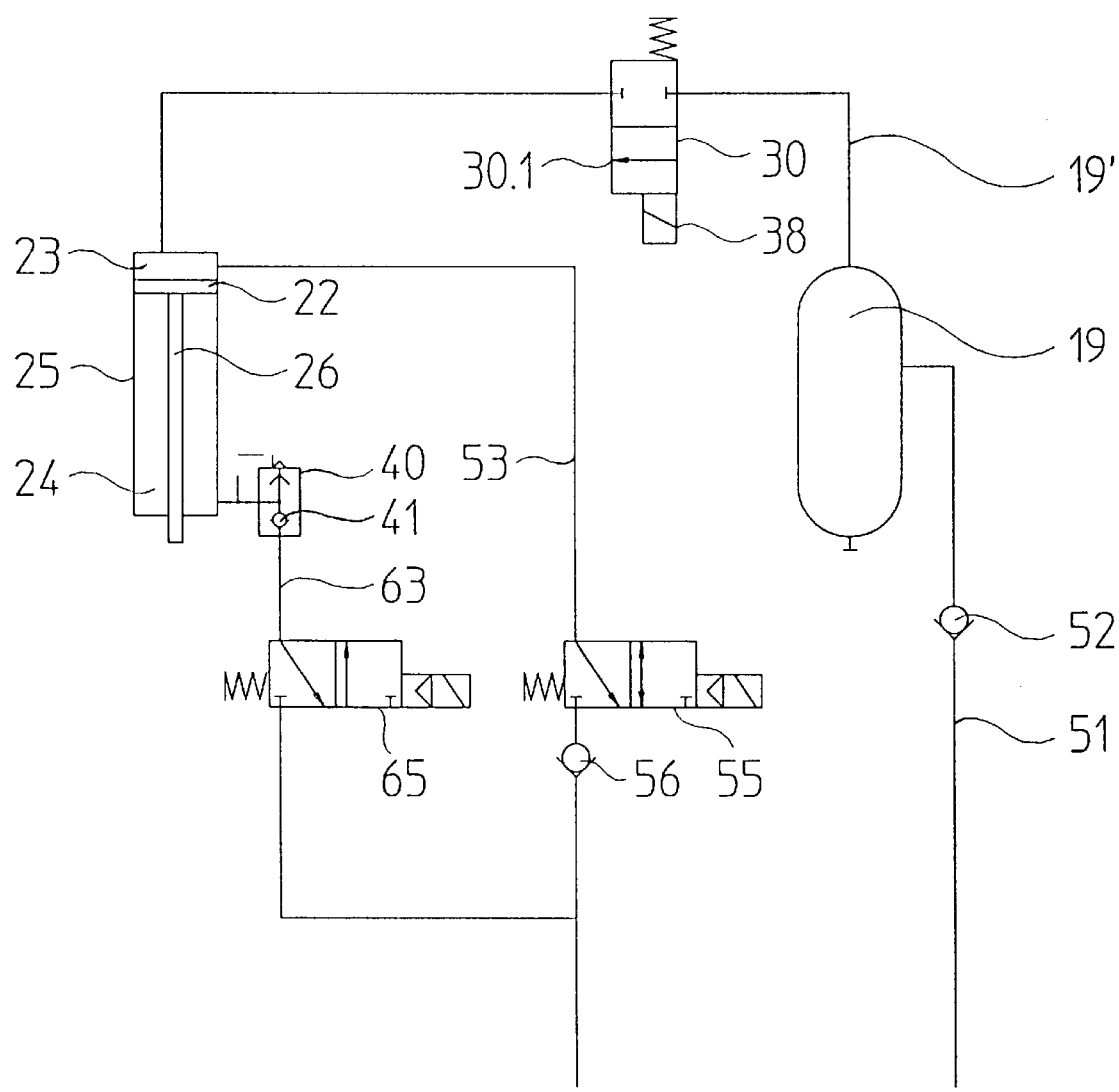
FIG. 3 is a diagram of the valve control arrangement of the driving device according to FIG. 1.

FIG. 3 shows the pneumatic control arrangement of the driving device 20 diagrammatically. The pressure medium reservoir 19 can be obtained as a commercially available vessel and it is connected by way of a line 51 and a non-return valve 52 to a source of compressed air, which supplies an operating pressure of 6 to 10 bars and is normally present in an industrial plant. Therefore, no additional pump unit is required. A further advantage is provided by this driving device according to the invention, since this economically produced pressure medium reservoir 19 is always supplied with the necessary air pressure, without special precautions.

The closing valve 30 described above in detail can be displaced by an electrical actuating member 38 from the closed starting position into an open position 30.1, due to which the compressed air flows into the working chamber 23 in the cylinder 25. Parallel thereto, a further line 53 leads into this chamber 23, which line is connected by way of an operable valve 55 and a non-return valve 56 to a further source of compressed air with a lower operating pressure of 2 to 5 bars. In the initial position of the valve 55 illustrated, the line 53 is moreover open to the outside air. This valve 55 serves primarily for checking the function of the shut-off device 10. Furthermore, it is simultaneously switched on when the closing valve 30 is opened.

At the air-vent valve 40, the displacement chamber 24 of the piston/cylinder unit is connected by way of a line 63 and an operable valve 65 likewise to a source of lower compressed air at 2 to 5 bars. This connection serves for the displacement of the piston 26 into the retracted position, in which the slide valve plate 11 is open. In the initial position, the closing valve 65 is likewise closed and the line 63 is open to the outside air. After this valve 65 has been opened by electrical actuation, the compressed air is guided through the line 63 and through the non-return valve 41 opened thereby in the air-vent valve 40 into the chamber 24. At the same time as the opening of valve 65, the air located in the chamber 23 may escape without resistance through the valve 55 to the outside air.

When checking the function of the shut-off valve 10, the valve 55, but not that at the reservoir 19, is opened and thus compressed air at a pressure of for example 2 bars is introduced into the chamber 23, due to which the piston 22 and the slide valve plate 11 move downwards. Due to limit position signal transmitters (not shown), a limit position can then be ascertained and evaluated for example by the control arrangement. Due to the subsequent closing of this valve 55 and the opening of the valve 65, the piston 22 and the slide valve plate 11 are correspondingly raised. In this way, a defect in the device for protection against explosions can be checked in a preventative manner, since as a rule this shut-off device actually only comes into use in the case of an emergency.

The invention is adequately explained with reference the above-mentioned embodiment. Air is advantageously provided as the pressure medium. However, another gas could also be used.

I claim:

1. A driving device for operating a shut-off device to be employed in a pipeline, said driving device comprising:

a piston/cylinder unit including a cylinder, and a piston connectable to a slide valve plate of the shut-off device, said piston being movable within said cylinder and dividing an interior thereof into a working chamber and a displacement chamber;

said piston/cylinder unit having a cylinder head having therein an opening that opens into said working chamber and a chamber that connects to said opening;

a closing valve on said cylinder head and having a valve disc operable to close connection of said chamber to said opening; and a pressure medium reservoir having an outlet opening connected to said chamber such that pressure medium from said reservoir arrives from said reservoir into said chamber, whereby upon opening of said valve disc the pressure medium passes virtually directly to said opening and into said working chamber, resulting in said piston closing the slide valve plate in a very short period of time.

2. A driving device as claimed in claim 1, wherein said chamber in said cylinder head is annular.

3. A driving device as claimed in claim 1, wherein said opening is defined by a ring surrounded by said chamber in said cylinder head and against which rests said valve disc in a closed position thereof.

4. A driving device as claimed in claim 1, further comprising a diaphragm having an outer periphery fixed in said cylinder head, said diaphragm supporting said valve disc and exerting a force thereon in a closing direction thereof, and said diaphragm and said valve disc together defining with said cylinder head a valve chamber connected to said chamber by a through-hole in said diaphragm.

5. A driving device as claimed in claim 1, further comprising a further outlet opening leading from said displacement chamber through said cylinder, and an air vent valve connected to said further outlet opening and having a sound insulation member.

6. A driving device as claimed in claim 1, further comprising a separate valve control for preventative checking of the functional capacity of the shut-off device.

7. A driving device as claimed in claim 6, wherein said control comprises a valve connected to said working chamber by a line and operable to be opened to connect said working chamber to a source of pressure medium at a pressure lower than the pressure of the pressure medium in said reservoir, thereby enabling movement of said piston within said cylinder to close the slide valve plate of the shut-off device.

8. A driving device as claimed in claim 7, wherein said control further comprises another valve connected to said displacement chamber by another line and operable to be opened to connect said displacement chamber to a source of pressure medium at a pressure lower than the pressure of the pressure medium in said reservoir, thereby enabling movement of said piston within said cylinder to open the slide valve plate of the shut-off device.

9. A driving device as claimed in claim 6, wherein said control comprises a valve connected to said displacement chamber by a line and operable to be opened to connect said displacement chamber to a source of pressure medium at a pressure lower than the pressure of the pressure medium in said reservoir, thereby enabling movement of said piston within said cylinder to open the slide valve plate of the shut-off device.

10. A driving device as claimed in claim 1, wherein pressure medium in said reservoir is supplied with a pressure of between 5 and 10 bars existing in an industrial plant.

11. A driving device as claimed in claim 1, wherein said reservoir comprises a commercially available vessel.

12. A driving device as claimed in claim 1, wherein said outlet opening is directly connected to said chamber.

13. A driving device for operating a shut-off device to be employed in a pipeline, said driving device comprising:

a piston/cylinder unit including a cylinder, and a piston connectable to a slide valve plate of the shut-off device, said piston being movable within said cylinder and dividing an interior thereof into a working chamber and a displacement chamber, said piston/cylinder unit having therein an opening that opens into said working chamber;

a pressure medium reservoir having an outlet opening connected virtually directly to said opening leading into said working chamber, resulting in said piston closing the slide valve plate in a very short period of time; and a further outlet opening leading from said displacement chamber through said cylinder, and an air vent valve connected to said further outlet opening and having a sound insulation member.

14. A driving device as claimed in claim 13, further comprising a separate valve control for preventative checking of the functional capacity of the shut-off device.

15. A driving device as claimed in claim 14, wherein said control comprises a valve connected to said working chamber by a line and operable to be opened to connect said working chamber to a source of pressure medium at a pressure lower than the pressure of the pressure medium in said reservoir, thereby enabling movement of said piston within said cylinder to close the slide valve plate of the shut-off device.

16. A driving device as claimed in claim 15, wherein said control further comprises another valve connected to said displacement chamber by another line and operable to be opened to connect said displacement chamber to a source of pressure medium at a pressure lower than the pressure of the pressure medium in said reservoir, thereby enabling movement of said piston within said cylinder to open the slide valve plate of the shut-off device.

17. A driving device as claimed in claim 14, wherein said control comprises a valve connected to said displacement chamber by a line and operable to be opened to connect said displacement chamber to a source of pressure medium at a pressure lower than the pressure of the pressure medium in said reservoir, thereby enabling movement of said piston within said cylinder to open the slide valve plate of the shut-off device.

18. A driving device as claimed in claim 13, wherein pressure medium in said reservoir is supplied with a pressure of between 5 and 10 bars existing in an industrial plant.

19. A driving device as claimed in claim 13, wherein said reservoir comprises a commercially available vessel.

* * * * *